No. 731,705. PATENTED JUNE 23, 1903.
G. C. OTTEN.
GAS GENERATING APPARATUS.
APPLICATION FILED JAN. 5, 1903.
NO MODEL. 2 SHEETS—SHEET 1.
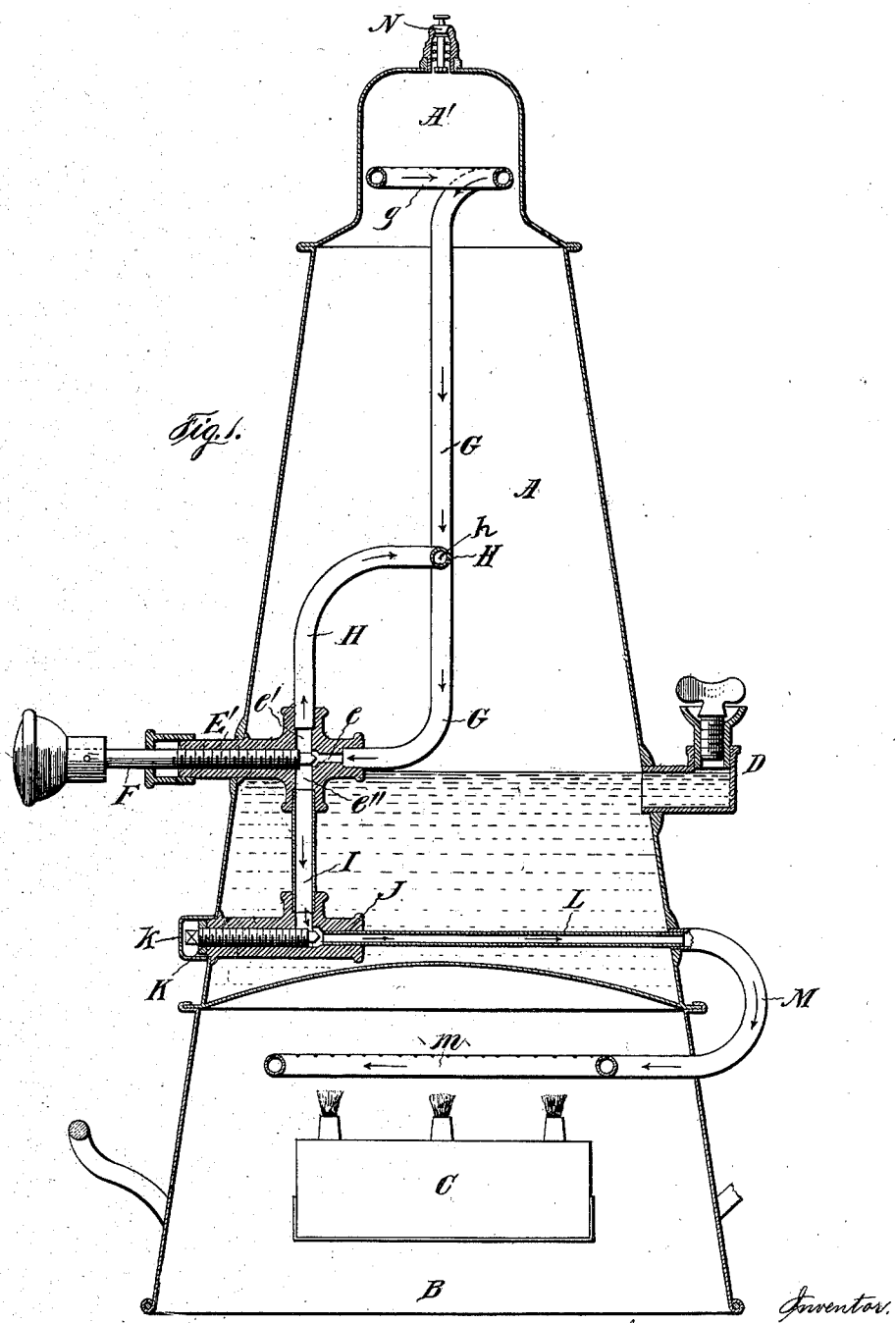

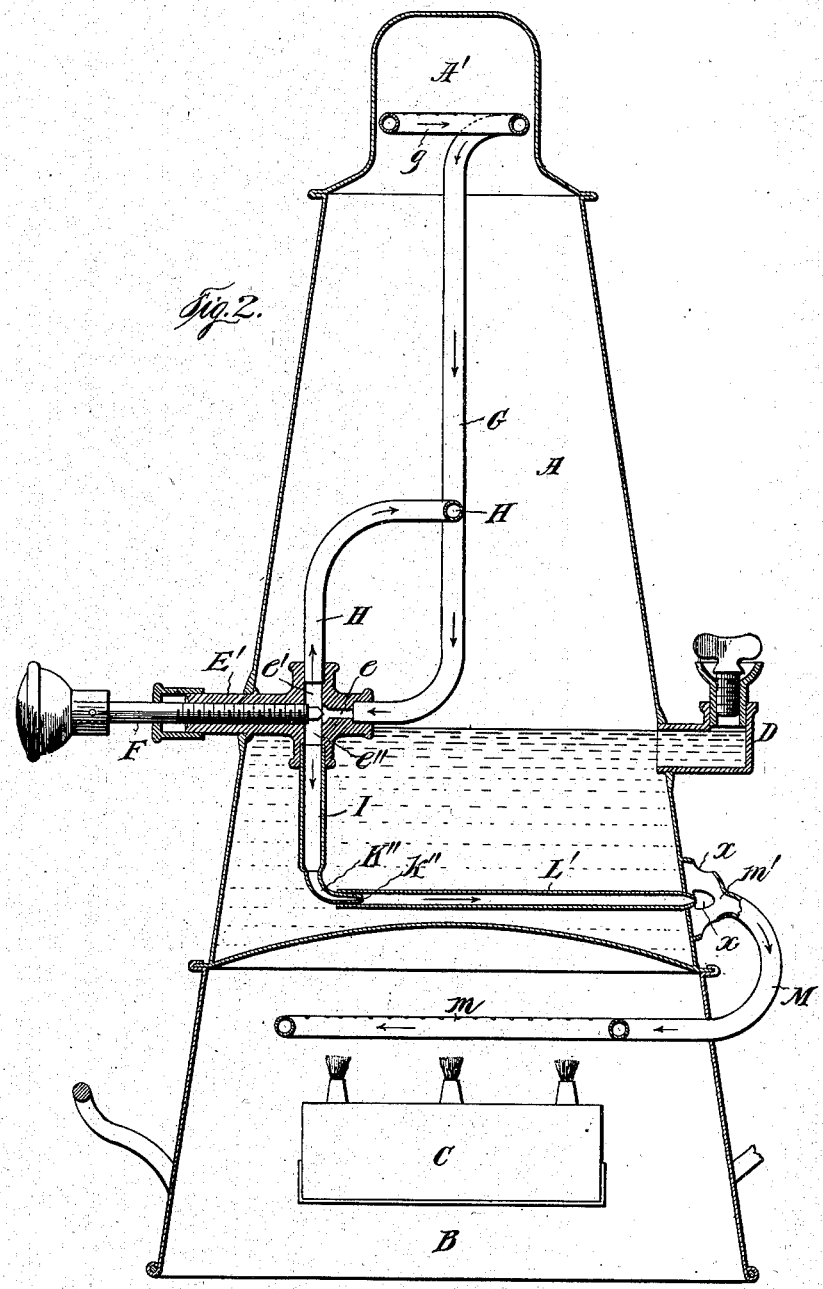

No. 731,705. Patented June 23, 1903.

UNITED STATES PATENT OFFICE.

GERRIT CORNELIS OTTEN, OF ORNHEM, NETHERLANDS.

GAS-GENERATING APPARATUS.

SPECIFICATION forming part of Letters Patent No. 731,705, dated June 23, 1903.

Application filed January 5, 1903. Serial No. 137,920. (No model.)

*To all whom it may concern:*

Be it known that I, GERRIT CORNELIS OTTEN, manufacturer, a subject of the Queen of the Netherlands, and a resident of 20 Velperweg, Ornhem, in the Kingdom of the Netherlands, have invented certain new and useful Improvements in and Relating to Gas-Generating Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the production of gas, and has for its object a generating apparatus for alcohol or other liquids which when vaporized produce combustible gases.

The invention is based upon the principle of proportioning the production of the gas to the amount consumed.

Two constructional forms of apparatus for carrying the invention into practice are illustrated, by way of example, in the accompanying drawings.

Figure 1 is a vertical section through the apparatus, and Fig. 2 a similar view of a modification.

In the form shown in Fig. 1 the apparatus consists of a reservoir A, preferably in the form of a truncated cone. Any other convenient form may, however, be adopted. This reservoir A rests upon a metallic part B, serving as a base and also for the reception of a removable lamp C. The reservoir A is provided laterally with a socket D, through which the alcohol or other liquid employed is introduced for the purpose of being vaporized. This tube is closed by a screw-plug and is arranged at such a height that it is impossible to introduce too large a quantity of liquid into the reservoir, having regard to the size of this latter. Upon the side of the reservoir opposite to this tube D is arranged a regulating device consisting of a tubular socket E', internally screw-threaded and projecting within the apparatus, where it presents three openings $e$, $e'$, and $e''$. Outside the reservoir A the socket E receives a screw F, provided with a handle, the inner extremity of this screw serving to close to a greater or less extent the said three openings $e$, $e'$, and $e''$. Upon these three openings are fitted three tubes. First is the tube G, through which the gas passes into the regulating appliance, which tube extends toward the upper portion or dome A' of the reservoir A, where it forms a perforated crown $g$, through which the gas produced in the reservoir A enters the tube G. The second tube H, also extending upward, serves for conducting the gas outside the apparatus through the pipe $h$, and the third tube I, extending downward, conducts a portion of the gas generated to supply the heating-burner $m$. At the lower portion of the reservoir A and communicating with the tube I is mounted a tube J, internally screw-threaded for the reception of a screw K, which is screwed into a depth such that the opening for the passage of gas from the said tube J into the pipe L is exactly proportioned to the cross-sectional area of the outlet-orifice of the pipe $h$ of the delivery-tube H for the purpose of establishing a definite relation between the quantity of gas consumed and the quantity produced. The object is merely to regulate the aperture of the gas-passage, which should be very small, so that the flame of the heating-burner may be of the proper dimensions, as if this flame is too large the apparatus would generate more gas than is consumed. On the other hand, if this flame were too small the apparatus would not generate sufficient gas for the consumption. When once this regulation has been made, the head of the screw K may be covered with a cap $k$, which may be brazed to the apparatus in order to prevent any unauthorized manipulation. Upon the tube J is adapted a pipe L, conducting the gas for the supplying the heating-burner on the pipe M, which pipe is fitted to the said pipe L outside the apparatus and which is bent downward toward the lower portion of the reservoir A, where it is formed into a perforated crown, so as to constitute the burner $m$.

Fig. 2 shows an appliance in which the regulating-socket J is omitted and replaced by a bent tube K'', terminating in a small aperture $k''$, the diameter of which is such that it presents a direct relation with the outlet-aperture $h$ of the pipe H.

In the dome A', Fig. 1, is arranged a spring-seated safety-valve N. From what has been said it will, however, be readily understood that if the burner-flame is properly adjusted relatively to the volume of gas or vapor discharged, or, in other words, if the heat supplied for generating gas or vapor is regulated in accordance with the consumption of said gas or vapor, an excessive or dangerous production of such is impossible during the operation of the apparatus unless the attendant has failed to extinguish or remove the starting-lamp C, as in this case the volume of gas or vapor produced would be much greater than the volume of gas or vapor discharged from the generator. This valve N is omittedt in the form of apparatus represented in Fig. 2, as it is not necessary, owing to the exact relationship established between the outlet-aperture $h$ and the aperture $k$—that is to say, the aperture giving access to the burner.

Another modification (represented in Fig. 2) is that where the pipe L' opens into the pipe M, conducting to the burner. The said pipe M is enlarged, as shown at $m'$, said enlarged portion having air-admission apertures $x\,x$, which are provided so as to permit the outer air mixing with the alcohol vapor or the like, whereby the heating power of the flame is increased.

Having thus described the constituent parts of the apparatus, I will now describe its operation. The reservoir having been supplied with liquid through the socket D, this latter is closed, the regulating device is opened by turning the handle F, and the lamp C is ignited. The heat produced by this lamp vaporizes a portion of the liquid, and the gas generated rises in the reservoir A to the dome A', whence it passes through the perforations of the crown $g$ into the tube G, in which it descends and passes into the regulating device E, where it is divided into two parts, one of which proceeds to the burner $m$, this portion being reduced, owing to the regulation previously effected by means of the screw K of the socket J, Fig. 1, or by the restricted portion formed in the bent tube K, Fig. 2. The other portion of the gas passes through the tube H outside the apparatus in the pipe $h$ for the purpose of consumption. When once the apparatus has been started by means of the removable lamp or the like for preliminary heating, which as soon as the gas it has caused to be generated reaches the burner $m$ and is ignited by the said lamp is extinguished or removed, it will continue to automatically produce the desired quantity of gas until the quantity of liquid with which the apparatus has been supplied is exhausted. When this takes place, it is only necessary to replenish the apparatus, which will then continue to operate as before. If it is desired to suspend the generation of gas before the liquid to be vaporized is exhausted, it is only necessary to screw home the screw F.

This apparatus may be employed in combination with gas-consuming appliances of all kinds and with every description of burner either for heating or illuminating the gas-supply and of obtaining any desired intensity of flame from the smallest to the largest merely by turning the handle F in one direction or the other.

The advantages presented by this invention are as follows:

First. The operation of the apparatus is not attended with any danger of explosion, because any overproduction of gas such as could cause an explosion is impossible, owing to the equilibrium which exists between the consumption and the generation of gas, as by rotating the handle F in one direction the volume of gas supplied to the heating-burner and the volume of gas available for consumption are reduced at one and the same time—that is to say, the flames of the heating-burner become smaller, so that naturally less gas is generated in the apparatus. In the same manner by turning the handle in the opposite direction the volume of gas passing to the heating-burner is increased, and consequently the volume of gas generated for consumption also, the flames of the burner in this case becoming larger and of course producing more gas in the apparatus.

Second. The combination of the regulating device within the apparatus prevents condensation and escape of gas.

Third. Owing to its simplicity, its certainty of operation, and its safety in view of the construction of the regulating device, the apparatus will be found specially adapted to the requirements of small industries and, in fact, for all purposes for which combustible gas is required.

Having now particularly described and ascertained the nature of my said invention and in what manner the same is to be performed, I declare that what I claim is—

1. A generator comprising a reservoir for a vaporizable liquid, a tubular socket, a gas or vapor intake contained within the reservoir and having its inlet above the normal level of liquid therein, a gas or vapor outtake, both intake and outtake connected with the aforesaid socket within the reservoir and a valve controlling both the outlet of the intake and inlet of the outtake, for the purpose set forth.

2. A generator comprising a reservoir for a vaporizable liquid, a tubular socket projecting into the reservoir, a gas or vapor intake having its inlet above the normal level of liquid in the reservoir, a gas or vapor outtake, a burner below the reservoir, said intake and outtake and said burner connected to the aforesaid socket within the reservoir and a valve in said socket controlling the outlet of the intake and the inlet to the outtake and burner, for the purposes set forth.

3. In a gas-generator, a reservoir for volatile liquid, a tubular socket, a pipe leading therefrom and terminating in a perforated crown in the gas-space of the reservoir, a gas-supply pipe and a pipe terminating in a burner beneath the reservoir, both connected to the socket and a single valve controlling all of the pipes, substantially as described.

4. In a gas-generator, a reservoir for volatile liquid, a tubular socket, a pipe leading therefrom and terminating in a perforated crown in the gas-space of the reservoir, a gas-supply pipe and a pipe terminating in a burner beneath the reservoir, both connected to the socket, a single valve controlling all of said pipes and means to control the quantity of gas to the burner in proportion to the amount produced for consumption, substantially as described.

5. In a gas-generator, a reservoir for volatile liquid, a tubular socket, a pipe leading therefrom to the gas-space of the reservoir and terminating in a perforated crown, a gas-supply pipe and a pipe terminating in a burner beneath the reservoir, both connected to the socket, a single valve controlling all of said pipes and an auxiliary valve in the burner-pipe to proportion the gas supplied to the burner to that generated, substantially as described.

In testimony that I claim the foregoing as my invention I have signed my name in presence of two subscribing witnesses.

GERRIT CORNELIS OTTEN.

Witnesses:
GERRIT VAN DE GEVEL,
ARIE VAN DE GEVEL.